Sept. 8, 1925. 1,552,939
H. J. MACKEY
WEIGHING MACHINE
Filed Oct. 21, 1920 3 Sheets-Sheet 3
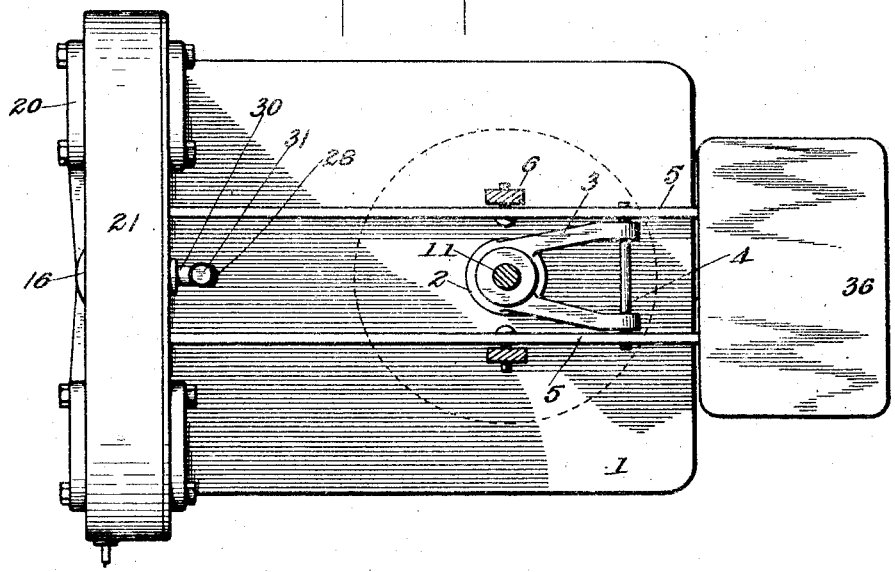
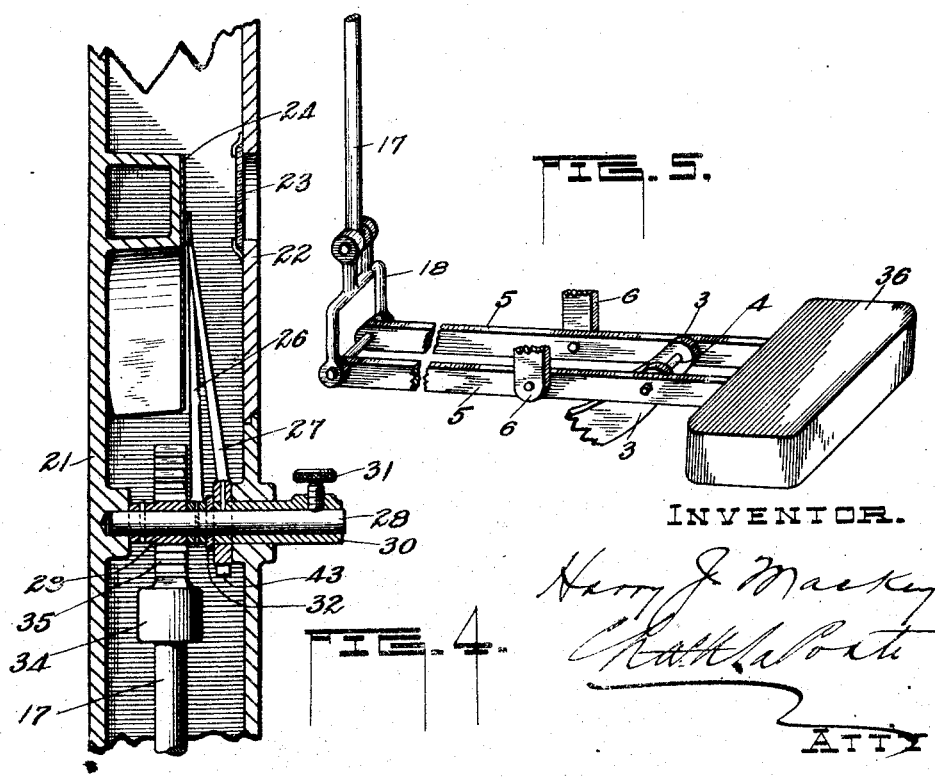
INVENTOR.
Harry J. Mackey
ATTY Patented Sept. 8, 1925.

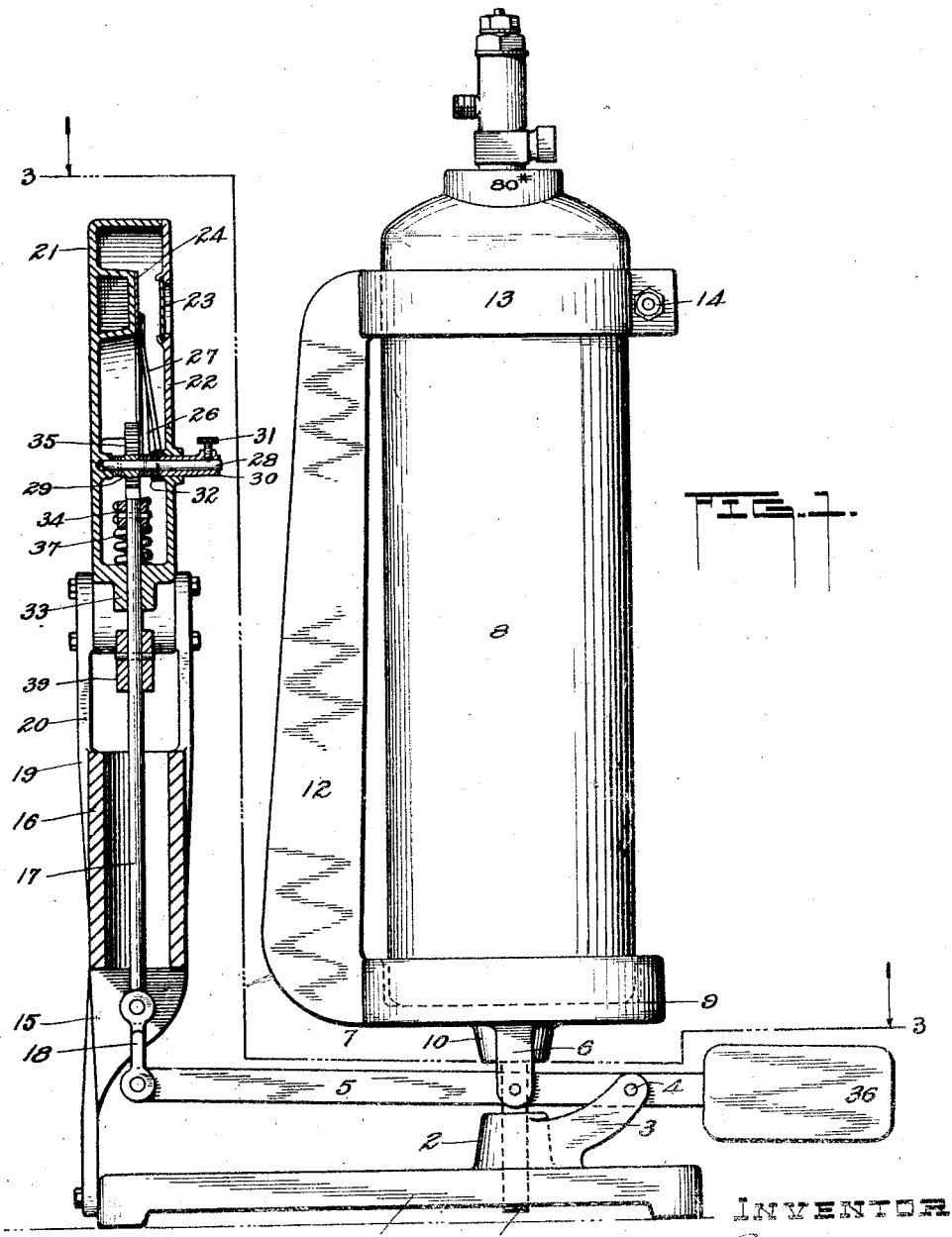

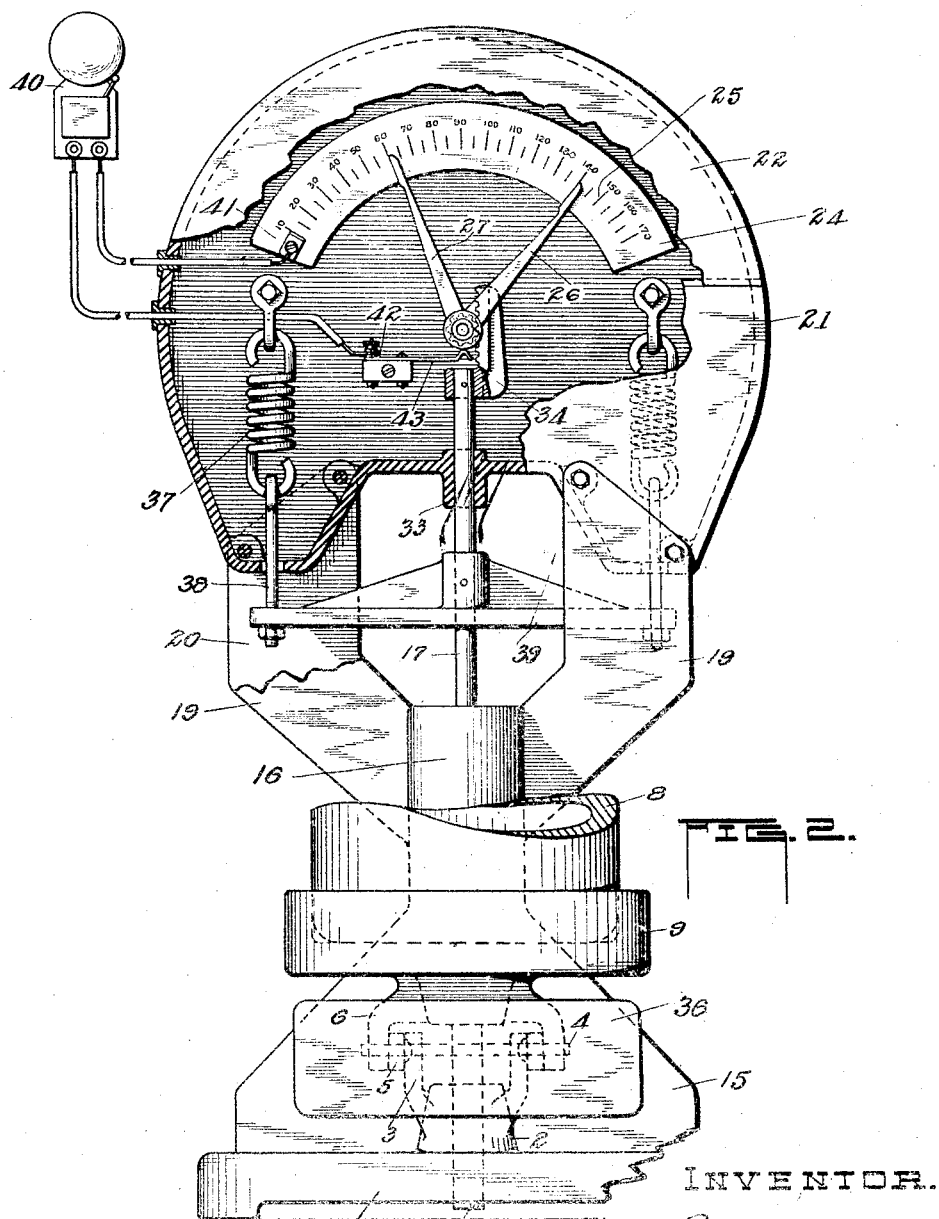

1,552,939

UNITED STATES PATENT OFFICE.

HARRY J. MACKEY, OF DECATUR, ILLINOIS.

WEIGHING MACHINE.

Application filed October 21, 1920. Serial No. 418,373.

*To all whom it may concern:*

Be it known that I, HARRY J. MACKEY, a citizen of the United States, a resident of Decatur, in the county of Macon and State of Illinois, have invented new and useful Improvements in Weighing Machines, of which the following is a specification.

This invention has reference to weighing machines, and it has for its principal object to provide a weighing scale which may be used to determine by weighing, the exact amount of carbonic gas received by dispensers, in drums containing the same and which will enable the user to tell under all working conditions and at all times, just how many pounds of gas are in the drum.

The invention has for a further object to provide a weighing scale for the purposes stated, having an attachment to hold the drum of gas in place; such attachment co-acting with the registering means, whereby the actual weight of tank and gas contents may be indicated, and by the manual manipulation of certain indicating parts, such parts may be set so as to indicate on the register the net weight of gas in the drum and the amount of gas in the drum from time to time, as it is used.

A further object of the invention is to connect the registering means with a suitable alarm which will notify the user of the gas when the drum is empty, or about empty, that the drum may be changed.

Drums containing carbonic gas $CO_2$ is sold to the dispensing trade in drums, at a price per pound. These drums are of different sizes and of different weight, and the weight of the drum is caused to be marked thereon. To determine the weight of the drum when containing gas, is to weigh drum and contents and by subtracting the weight marked on the drum from the gross weight will give the net weight of the gas contained therein. So far as I am aware no means is provided, for use by the dispensing trade, to indicate how much gas is in the drum while it is being used, and unless the user is provided with means for weighing drum and gas contents the user may not know for a certainty the actual pounds of gas in the container at the time of purchase. My invention overcomes these objections, in that, by its use, the purchaser may know at the time of purchase the exact and net weight of the gas in the container and he may keep himself informed from time to time, as the gas is used just how much gas is in the container. Further, he may if he wishes, have an alarm supplied with the weighing device, adjusted to inform him when the tank is empty, or nearly so, thus giving him an opportunity of replacing the tank.

That the invention may be more fully understood reference is had to the accompanying drawings forming a part of the description, illustrating a preferred embodiment of the invention, in which:—

Fig. 1 is a side view, partly in section, showing my weighing scale, and with a gas drum supported on the attachment thereof;

Fig. 2 is a front elevation, on a larger scale, partly in section and partly broken away, which shows the register and alarm, also the drum holding attachment;

Fig. 3 is a plan view, partly in section, as the same would appear if taken on the line 3—3 Fig. 1;

Fig. 4 is a detail in cross-section through the registering means, and

Fig. 5 is a detail in perspective showing the scale-beam, weight connected thereto, and connecting means to the register.

Like characters of reference denote corresponding parts throughout the figures.

The machine comprises a base 1 formed or provided with an upstanding tubular bearing or boss 2 from which extend the arms 3 forming a bearing for a spindle or stem 4 on which are fulcrumed the bars 5 constituting the scale beam. Said bars 5 are also connected to depending ears 6 on an attachment 7 which supports a gas drum 8. This attachment includes the recessed base plate or bowl 9 from which depend the ears 6 and also a centrally disposed boss 10 in which is secured a stud or shaft 11 having vertical movement in the base 1 through the bearing or boss 2. Upstanding from the base plate or bowl 9 and connected with its periphery, is a brace arm 12 attached at its upper end to the periphery of a split ring 13 which is adapted to be passed about or around the upper part of a drum 8 and clamped by means of a bolt 14. The drum 8, as will be observed rests on the base plate or bowl 9 within the recess therein; its upper end is held by the ring 13, and to guide and sustain the attachment the stud or shaft 11 extends through and has movement up and down in the bearing or boss 2. The drum 8 is of that type commonly used for containing carbonic gas, well known to the soda dispensing trade and like places, and the tare weight of such drums is usually marked on the neck of the drum or other convenient place. For example, I have assumed the tare weight of the drum illustrated is "80" pounds.

To the rear end of the base 1 is suitably connected and upstanding therefrom a frame 15, which, intermediate its upper and lower ends is formed or provided with an elongated tubular body 16 through which is guided a suspension rack-bar 17, the lower end of which has a pivotal connection with a link 18 pivotally connected to the inner ends of the bars 5 constituting the scale beam. The upper end of the frame 15 comprises front and rear spaced pairs of plates 19 and 20 respectively, to which and between which is bolted or otherwise suitably secured a casing 21. The portion 22 of the front wall of said casing is preferably removable to permit access to the interior of the casing, and said removable wall 22 has an arc shaped piece of glass 23 set therein to expose to view a similarly shaped dial 24 which has thereon a scale 25 of a suitable character on which pointers or hands 26 and 27, respectively, move. In the present instance the scale comprises a plurality of markings arranged radially relatively to the axis of the pointers or hands 26 and 27 and these markings are designated by the numerals "10" to "170", respectively, and graduated markings may appear therebetween, as desired, or thought necessary. While I have shown the scale beginning with the numeral "10", for purposes to be more fully explained, it is to be understood that it may begin with "0" or any other character.

The pointers or hands 26 and 27 are carried on and movable by a shaft 28, as I shall now explain. This shaft is journaled in the front and rear walls of the casing 21 and protrudes through the front wall, as shown. The pointer 26 is preferably secured direct to the shaft 28 and between it and the rear wall of the casing and secured on the shaft is a small gear wheel 29. On the forward end of the shaft and protruding through the casing is a sleeve 30 which is adjustable around the shaft and adapted to be secured in adjusted positions by means of the thumb-screw 31. The inner end of the sleeve is insulated from the pointer or hand 26 by the insulating collar 32. The pointer or hand 27 is preferably secured to the inner end of the sleeve 30, and it is therefore understood that when the sleeve 30 is manually adjusted around the shaft 28 that the pointer or hand 27 may be moved to any point on the scale 25. The bar 17 passes up through and has movement in a bearing 33 provided on the casing 21 and on its upper end is secured a casting or bracket 34 provided with a rack-bar 35 meshing with the gear wheel 29 on the shaft 28. Up and down movement of the rack-bar will impart alternate rotational movement to the shaft 28, as will be understood.

The balance means for the scale beam and the attachment pivotally connected thereto comprises a weight 36 of suitable size on the forward end of the beam, and a pair of springs 37 located within the casing 21, having one of their ends attached to the casing and their opposite ends attached to rods 38 which pass out of the lower end of the casing 21 and secured to a cross beam 39 which is secured to the bar 17 and has up and down movement between the pairs of plates 19 on the upper end of the frame 15.

We will assume that a dispenser of soda water takes in a drum marked "80" pounds and alleged to contain "60" pounds of carbonic gas, the total weight of drum and gas alleged to be "140" pounds. Having one of the machines, herein illustrated, in the basement of his establishment the drum is secured in the base plate or bowl 9 and the weight of said drum and gas contents causes the stud or shaft 11 to descend, depressing the scale beam, reciprocating the bar 17 downwardly, which, through its rack-bar 37 will impart rotational movement to the gear wheel 29 and shaft 28 swinging the pointer or hand 26 opposite the numeral "140" on the scale, indicating that the gross weight of drum and gas content is "140" pounds. By this means the dispenser may know definitely whether or not the alleged weight of drum and gas content is correct. That the dispenser may be kept informed from time to time just how much gas is in the drum, he will release the set screw 31 and turn the sleeve 30 on the shaft 28 so as to cause the pointer or hand to stop opposite the numeral "60" on the scale 25, which is the difference between the tare weight (80 lbs.) of the drum and the total weight. In other words, the tare weight (80 lbs.) of the drum is subtracted from the total weight (140 lbs.) showing that there is "60" pounds of gas in the drum. The set screw 31 is then set, so that as the gas is used, and the drum becomes lighter, allowing the scale beam to change its position and the rack-bar 35 to move upwardly, said rack-bar will impart rotational movement to the gear wheel 29, shaft 28 and sleeve 30. Such movement is in turn imparted to the pointers or hands 26 and 27, and the latter as it moves across the face of the dial will show just how much gas is in the drum, as it is used. Without some signalling device or alarm to indicate when the gas is about used up, the machine should be installed near where the party or parties using the gas may watch the dial from time to time.

However, I prefer that the machine, which would ordinarily be located in the basement, be connected with some suitable alarm or signalling device to notify the user when the gas is about used up. Such a signalling device could include an alarm bell 40 located at the soda fountain, or other convenient or suitable place, and said bell wired to the attachment. One wire attached to a plate 41 secured to the end of the dial 24 with which the pointer or hand will contact as it is moved backward to the end of the scale 25, and the other wire secured to a post 42 located in the casing 21 and insulated therefrom. To said post is connected a plate 43 bearing against the hub of the pointer or hand, as shown. As illustrated, when the pointer or hand 27 shows the gas reduced to "10" pounds in the drum, it will contact with the plate 41 secured to the dial completing the circuit which will ring the alarm 40 and the dispenser will know that the drum contains only ten pounds of gas and he can then prepare to set up another drum. While I have elected to so arrange the dial and alarm that the latter will ring when only ten pounds of gas is left in the tank, it is to be understood that it may be set for two, three or four pounds, or other desired amount. And while I have elected to illustrate a drum weighing "80" pounds, it is understood this is merely for example or illustrative purposes, and that the machine is constructed to handle drums of different sizes and different weights. Also, while I have elected to show the attachment fitted to handle only one drum, it would not require more than ordinary mechanical ability to arrange it to handle several drums.

What I claim is:

1. In a weighing machine, in combination, a scale, scale beam, a bowl connected to said beam and adapted to support a container, the weight of the container adapted to oscillate said beam, a pointer arranged to be actuated by said beam to designate on said scale the weight of container and contents, a pointer arranged to be manually set to indicate the net weight of the container contents, means to connect said last mentioned pointer with said beam, whereby it may be actuated as the contents of the container is removed to show the weight of the contents remaining in said container and an alarm arranged to be sounded when said manually set pointer reaches a predetermined point on said scale.

2. In a weighing machine, in combination, a base, an upstanding frame thereon, a scale therein, a beam fulcrumed on said base, a bowl pivotally connected to said beam and arranged to support a container, means on the bowl to embrace the upper part of the container to hold it in an upright position, a shaft in the frame, a pointer connected direct to the shaft, a pointer manually adjustable around said shaft, and means operated by the beam for imparting rotational movement to said shaft for moving both said pointers.

In witness whereof, I have hereunto affixed my hand this 15th day of October, 1920.

HARRY J. MACKEY.